(12) United States Patent
Bell, Jr. et al.

(10) Patent No.: US 7,900,071 B2
(45) Date of Patent: Mar. 1, 2011

(54) APPARATUS AND METHOD TO MANAGE POWER IN A COMPUTING DEVICE

(75) Inventors: Robert H. Bell, Jr., Austin, TX (US); Jose Raul Escalera, Austin, TX (US); Octavian Florin Herescu, Austin, TX (US); Vernon Walter Miller, Tucson, AZ (US); Michael Declan Roll, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 577 days.

(21) Appl. No.: 12/031,543

(22) Filed: Feb. 14, 2008

(65) Prior Publication Data

US 2009/0210727 A1    Aug. 20, 2009

(51) Int. Cl.
    *G06F 1/32* (2006.01)
(52) U.S. Cl. .................. 713/322; 713/300; 713/310; 713/320; 713/321; 713/324; 713/330; 713/340; 711/100; 711/114
(58) Field of Classification Search .......... 713/300, 713/310, 320–324, 330, 340; 711/100, 114
See application file for complete search history.

(56) References Cited

U.S. PATENT DOCUMENTS

| | | | |
|---|---|---|---|
| 5,402,200 A | | 3/1995 | Shrinkle et al. |
| 6,167,330 A | | 12/2000 | Linderman |
| 6,957,352 B2 | | 10/2005 | Greiner et al. |
| 7,039,819 B1 * | | 5/2006 | Kommrusch et al. ........ 713/322 |
| 7,092,190 B2 * | | 8/2006 | Nguyen et al. ................ 360/69 |
| 7,412,615 B2 * | | 8/2008 | Yokota et al. ................ 713/323 |
| 7,793,042 B2 * | | 9/2010 | Reeves et al. ................ 711/114 |
| 2002/0087903 A1 * | | 7/2002 | Hermerding et al. ........ 713/320 |
| 2002/0138159 A1 | | 9/2002 | Atkinson |
| 2003/0191889 A1 * | | 10/2003 | Forrer, Jr. .................... 711/112 |
| 2005/0211426 A1 | | 9/2005 | Ziarnik et al. |
| 2005/0240814 A1 * | | 10/2005 | Sasakura et al. .............. 714/14 |
| 2005/0289394 A1 * | | 12/2005 | Arrouye et al. ............... 714/15 |
| 2007/0288777 A1 * | | 12/2007 | Schutte ........................ 713/320 |

* cited by examiner

*Primary Examiner*—Abdelmoniem Elamin
(74) *Attorney, Agent, or Firm*—Dale F. Regelman; Quarles & Brady LLP

(57) ABSTRACT

A method to manage power in a computing device comprising a controller assembly and a storage assembly comprising a plurality of data storage devices, by selecting a processor parameter, establishing a threshold processor parameter value, establishing a threshold over-parameter time interval, selecting a data storage device parameter, and establishing a nominal data storage device parameter value. The method determines an actual processor parameter value. If the actual processor parameter value is less than or equal to the threshold processor parameter value, the method operates each of the plurality of data storage devices using the nominal data storage device parameter value. If the actual processor parameter value is greater than the threshold processor parameter value, then the method determines an actual over-parameter time interval. If the actual processor parameter value is greater than the threshold processor parameter value, and if the actual over-parameter time interval is greater than the threshold over-parameter time interval, then the method operates each of the plurality of data storage devices using a data storage device parameter value less than the nominal data storage device parameter value.

24 Claims, 10 Drawing Sheets

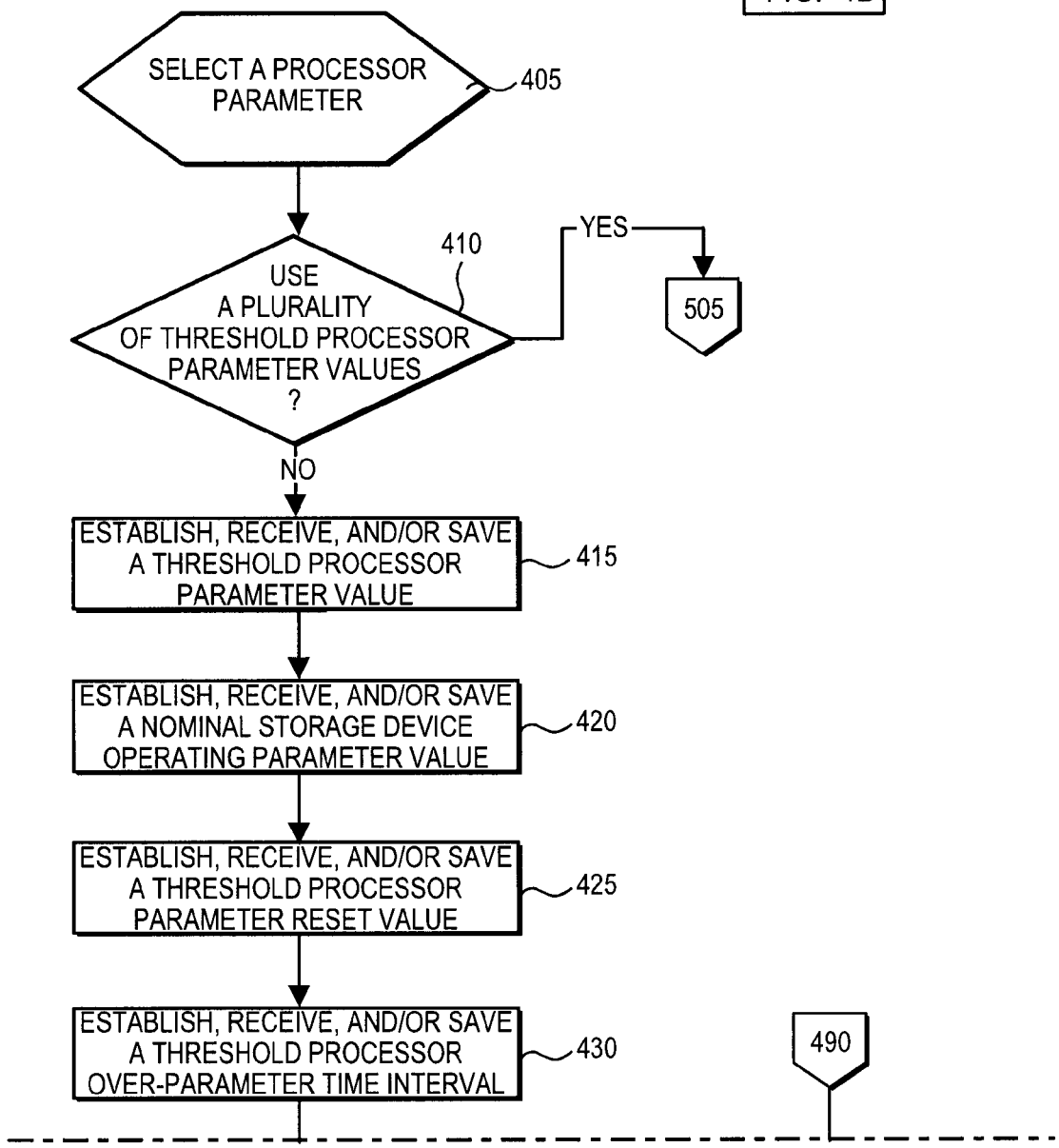

APPARATUS AND METHOD TO MANAGE POWER IN A COMPUTING DEVICE

FIELD OF THE INVENTION

This invention relates to an apparatus and method to manage power in a computing device.

BACKGROUND OF THE INVENTION

Computing devices typically comprise, among other things, one or more power supplies, one or more processors, and one or more data storage devices. In certain embodiments, computing devices further comprise certain input/output ("I/O") facilities that allow networking with other devices.

As more and more components and/or functions are packaged in smaller and smaller enclosures, management of both power and heat in a computing device becomes more important. Using prior art apparatus and power/heat management, a tradeoff between system size and system capability is required.

SUMMARY OF THE INVENTION

The invention comprises a method to manage power in a computing device comprising a processor assembly and a storage assembly comprising a plurality of data storage devices. The method selects a processor parameter and a data storage device parameter, wherein the power consumed by a processor is proportional to the processor parameter, and wherein the power consumed by a data storage device is proportional to the data storage device parameter. The method establishes a threshold processor parameter value and a nominal data storage device parameter value. The method determines an actual processor parameter value.

If the actual processor parameter value is less than or equal to the threshold processor parameter value, the method operates each of the plurality of data storage devices using the nominal data storage device parameter value. If the actual processor parameter value is greater than the threshold processor parameter value, then the method operates each of the plurality of data storage devices using a data storage device parameter value less than the nominal data storage device parameter value. In certain embodiments, if the actual processor parameter value is greater than the threshold processor parameter value throughout a threshold over-parameter time interval, then the method operates each of the plurality of data storage devices using a data storage device parameter value less than the nominal data storage device parameter value.

In certain embodiments, the method establishes a plurality of threshold processor parameter values, and a corresponding plurality of sub-nominal data storage device parameter values. If an actual processor parameter value is greater than an (i)th threshold processor parameter value for an (i)th over-parameter time interval, then the method operates each of the plurality of data storage devices using an (i)th sub-nominal data storage device parameter value.

BRIEF DESCRIPTION OF THE DRAWINGS

The invention will be better understood from a reading of the following detailed description taken in conjunction with the drawings in which like reference designators are used to designate like elements, and in which:

FIG. 4A is a flow chart summarizing the initial steps of Applicants' method;

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
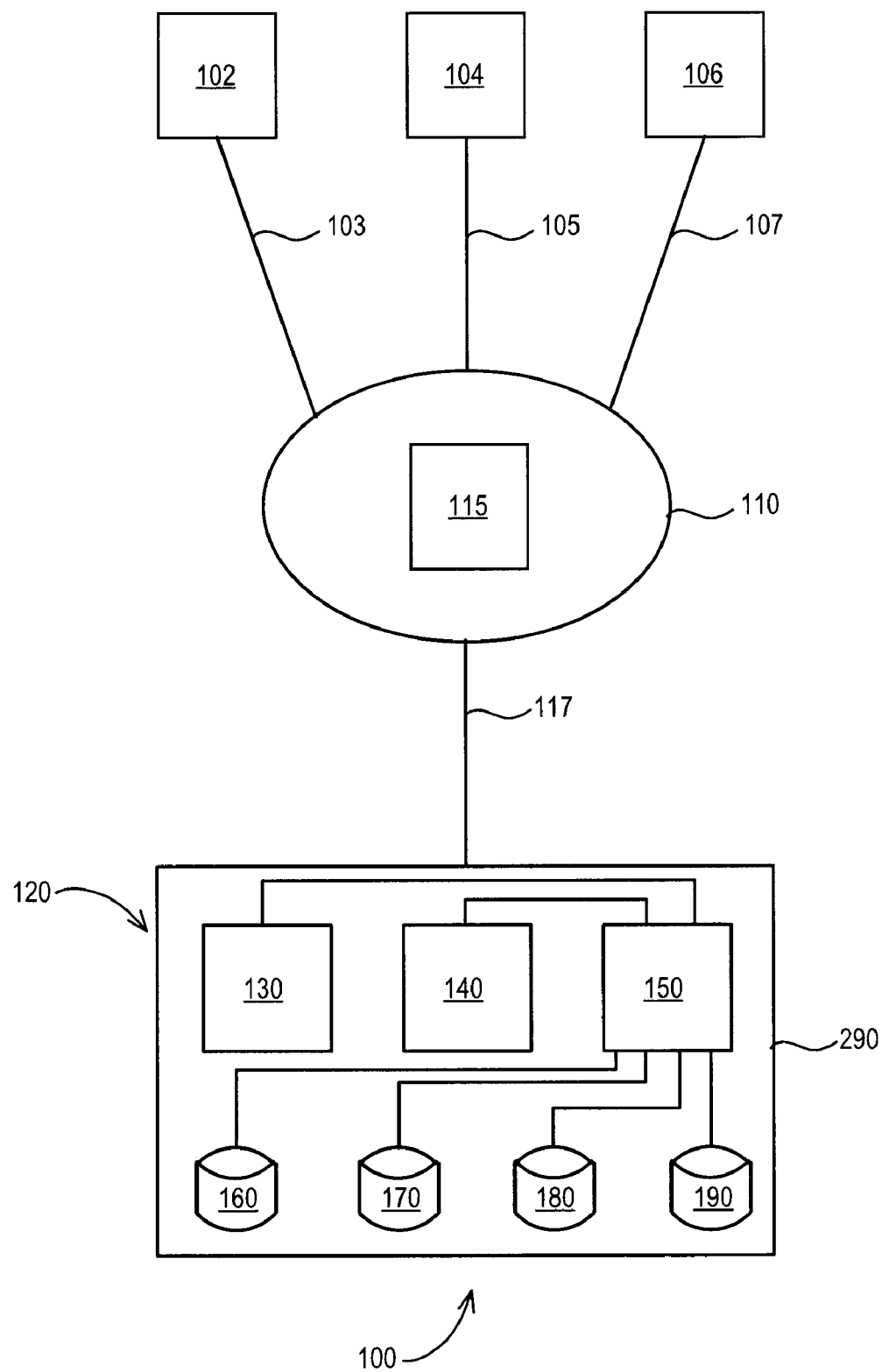
FIG. 1 is a block diagram showing one embodiment of Applicants' computing device in communication with a plurality of other computing devices.

In the illustrated embodiment of FIG. 1, Applicants' computing system 100 comprises computing device 120 which comprises data storage devices 160, 170, 180, and 190. Applicants' computing device 120 further comprises processor assembly 130, processor assembly 140, and storage assembly 150.

By "data storage device," Applicants mean an information storage medium in combination with the hardware, firmware, and/or software, needed to write information to, and read information from, that information storage medium. In certain embodiments, the information storage medium comprises a magnetic information storage medium, such as and without limitation a magnetic disk, magnetic tape, and the like. In certain embodiments, the information storage medium comprises an optical information storage medium, such as and without limitation a CD, DVD (Digital Versatile Disk), HD-DVD (High Definition DVD), BD (Blue-Ray Disk) and the like. In certain embodiments, the information storage medium comprises an electronic information storage medium, such as and without limitation a PROM, EPROM, EEPROM, Flash PROM, compactflash, smartmedia, and the like. In certain embodiments, the information storage medium comprises a holographic information storage medium.

Further in the illustrated embodiment of FIG. 1, Applicants' computing device 120 is in communication with host computers 102, 104, and 106. As a general matter, hosts computers 102, 104, and 106, each comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, one or more of host computers 102, 104, and/or 106, further includes a storage management program. In certain embodiments, that storage management program may include the functionality of storage management type programs known in the art that manage the transfer of data to and from a data storage and retrieval system, such as for example and without limitation the IBM DFSMS implemented in the IBM MVS operating system.

In the illustrated embodiment of FIG. 1, host computers 102, 104, and 106, are connected to fabric 110 utilizing communication links 103, 105, and 107, respectively. Communication links 103, 105, and 107, may utilize any type of I/O protocol, for example, Fibre Channel ("FC"), a direct attachment to fabric 110 or one or more signal lines used by host computers 102, 104, and 106, to transfer information to and from fabric 110.

In certain embodiments, fabric 110 includes, for example, one or more FC switches 115. In certain embodiments, those one or more switches 115 comprise one or more conventional router switches. In the illustrated embodiment of FIG. 1, one or more switches 115 interconnect host computers 102, 104, and 106, to computing device 120 via communication link 117. Communication link 117 may utilize any type of I/O interface, for example, Fibre Channel, Infiniband, Gigabit Ethernet, Ethernet, TCP/IP, iSCSI, SCSI I/O interface or one or more signal lines used by FC switch 115 to transfer information through, to, and from computing device 120, and subsequently data storage media 130, 140, 150, and 160. In other embodiments, one or more host computers, such as for example and without limitation host computers 102, 104, and 106, communicate directly with computing device 120 using communication links 103, 105, and 107, respectively.

Figure 2:
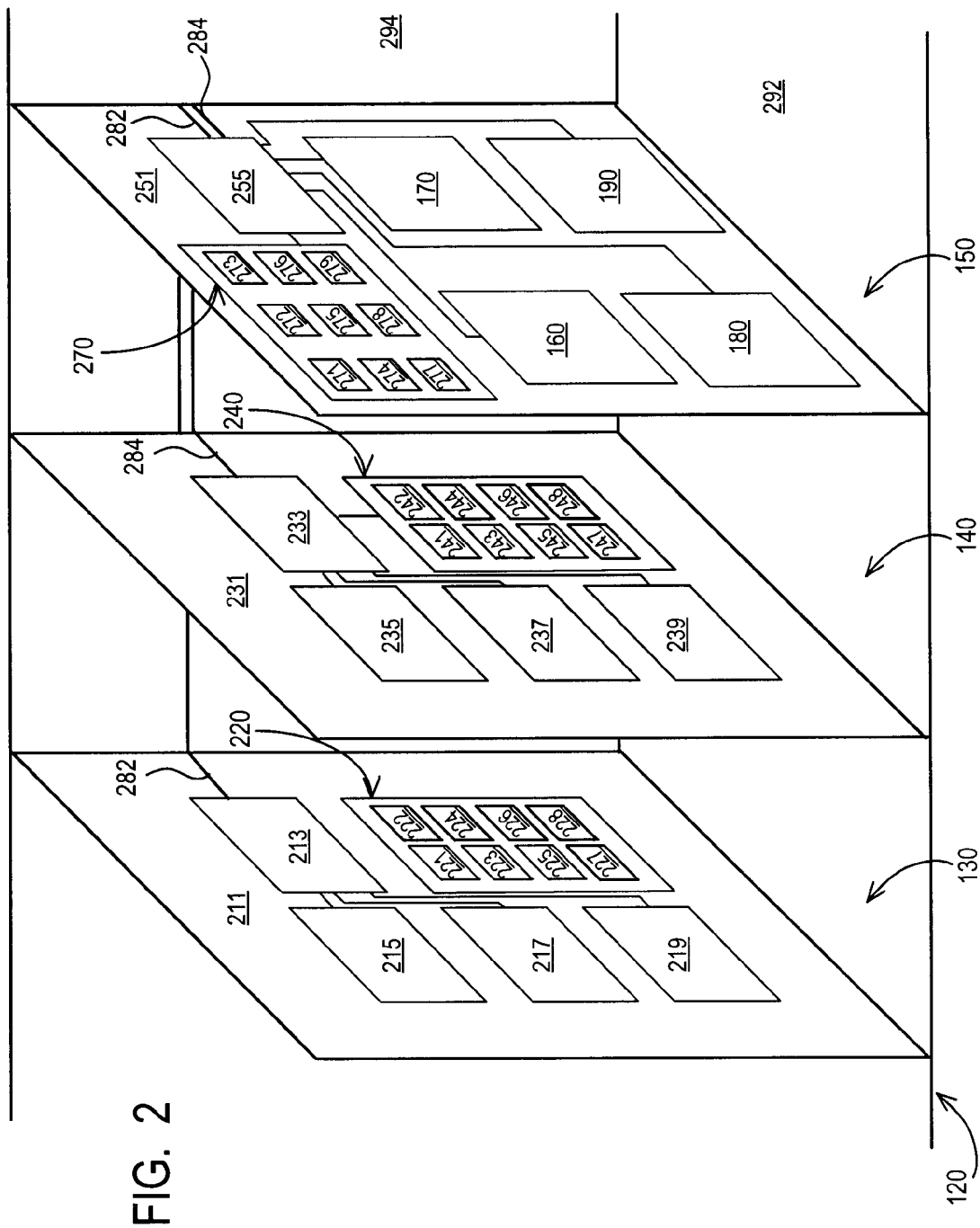
FIG. 2 is a block diagram showing Applicants' computing device comprising two processor assemblies in communication with a storage assembly.
Figure 3A:
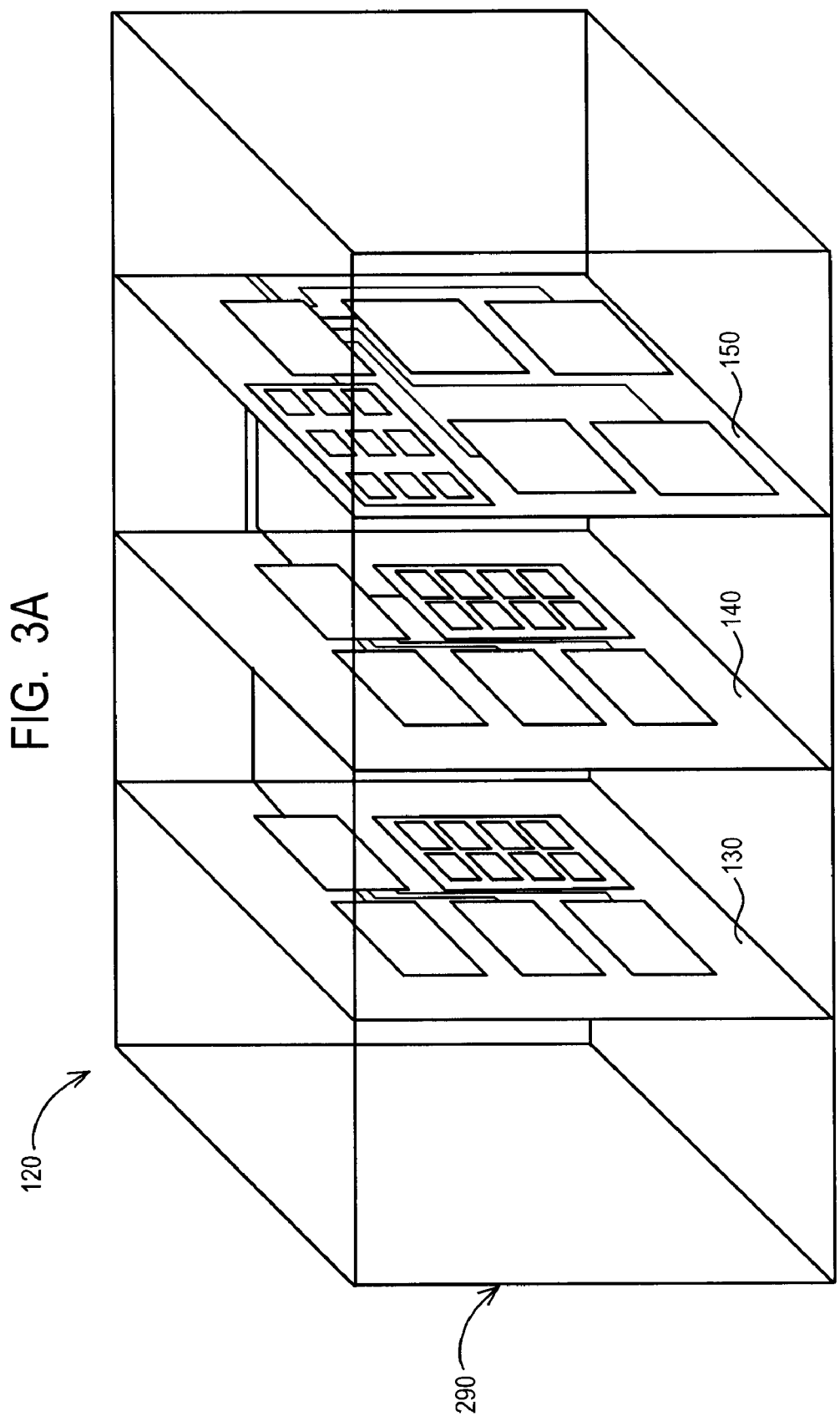
FIG. 3A is a block diagram showing the components of FIG. 2 disposed in a chassis.
Figure 3B:
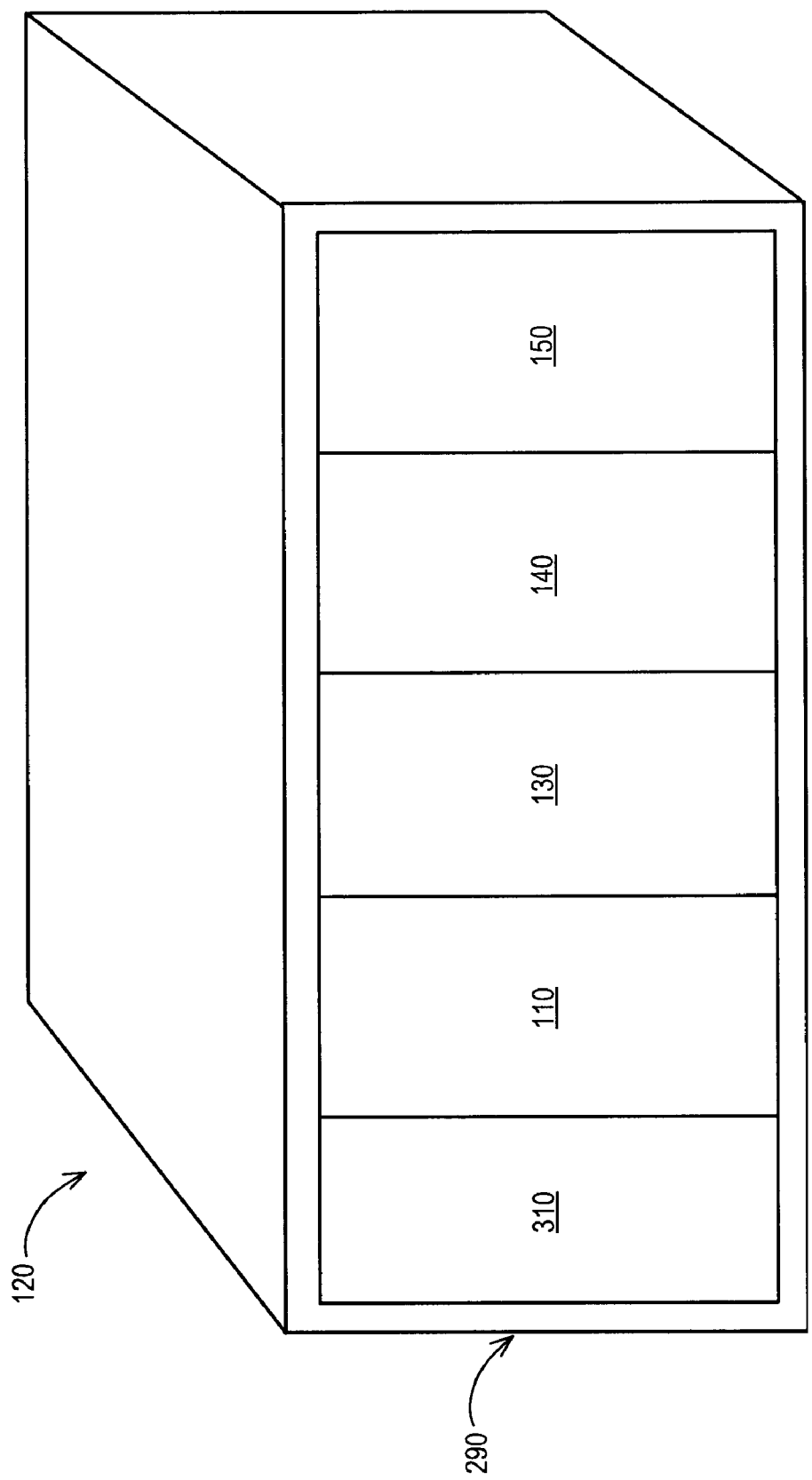
FIG. 3B shows an embodiment of Applicants' computing device comprising a removeable power supply assembly, a removeable networking assembly, a first removeable processor assembly, a second removeable processor assembly, and a removeable storage assembly, disposed in a chassis.

In the illustrated embodiment of FIG. 2, computing system 120 comprises processor assembly 130 disposed on substrate 211, wherein substrate 211 is removeably disposed within chassis 290 (FIGS. 3A, 3B). Processor assembly 130 comprises processor 213, temperature sensor 215, clock 217, performance sensor 219, and computer readable medium 220. In the illustrated embodiment of FIG. 2, first threshold processor parameter value 221, second threshold processor parameter value 222, first alert signal 223, second alert signal 224, nominal data storage device operating parameter 225, threshold processor parameter reset value 226, reset signal 227, and instructions 228, are encoded in memory 220.

In the illustrated embodiment of FIG. 2, computing system 120 comprises processor assembly 140 disposed on substrate 231, wherein substrate 231 is removeably disposed within chassis 290 (FIGS. 3A, 3B). Processor assembly 140 comprises processor 233, temperature sensor 235, clock 237, performance sensor 239, and computer readable medium 240. In the illustrated embodiment of FIG. 2, first threshold processor parameter value 241, second threshold processor parameter value 242, first alert signal 243, second alert signal 244, nominal data storage device operating parameter 245, threshold processor parameter reset value 246, reset signal 247, and instructions 248, are encoded in memory 240.

In the illustrated embodiment of FIG. 2, computing system 120 comprises data storage device assembly 150 disposed on substrate 251, wherein substrate 251 is removeably disposed within enclosure 290 (FIGS. 3A, 3B). Data storage device assembly 150 comprises processor 255, computer readable medium 270, data storage device 160, data storage device 170, data storage device 180, and data storage device 190. In the illustrated embodiment of FIG. 2, first threshold processor parameter value 271, second threshold processor parameter value 272, first alert signal 273, second alert signal 274, nominal data storage device operating parameter 275, threshold processor parameter reset value 276, reset signal 277, and instructions 278, are encoded in memory 270.

Processor 213 is in communication with processor 255 via communication link 282. Processor 233 is in communication with processor 255 via communication link 284.

As those skilled in the art will appreciate, computing device 120 further comprises additional elements, such as and without limitation one or more host adapters, one or more device adapters, a data cache, non-volatile storage, and the like.

FIG. 3A shows processor assembly 130, processor assembly 140, and storage assembly 150, disposed in chassis 290. FIG. 3B shows an embodiment of Applicants' computing device 120 comprising a removeable power supply assembly 310, a removeable networking assembly 110, a removeable processor assembly 130, a removeable processor assembly 140, and a removeable storage assembly 150, disposed in chassis 290. Power supply 310 provides power to each of the other assemblies disposed in computing device 120.

Applicants' invention comprises a method to manage power in a computing device comprising at least one controller assembly in communication with a storage assembly comprising a plurality of data storage devices. In certain embodiments, the computing device comprises a plurality of controller assemblies each in communication with the same storage assembly comprising a plurality of data storage devices. In certain embodiments, each of the one or more processor assemblies comprises a substrate, i.e. a "blade," a processor disposed on that substrate, i.e. a "processor blade," wherein each processor blade is removeably disposed within a chassis, i.e. a "blade center." In certain embodiments, the data storage assembly comprises a substrate, i.e. a "blade," a plurality of data storage devices disposed on that substrate, i.e. a "storage blade," wherein each that storage blade is removeably disposed within a chassis, i.e. a "blade center."

In certain embodiments, the computing device is in communication with one or more host computers. In certain embodiments, the computing device communicates with one or more host computers via a network protocol 110.

Figure 4B:
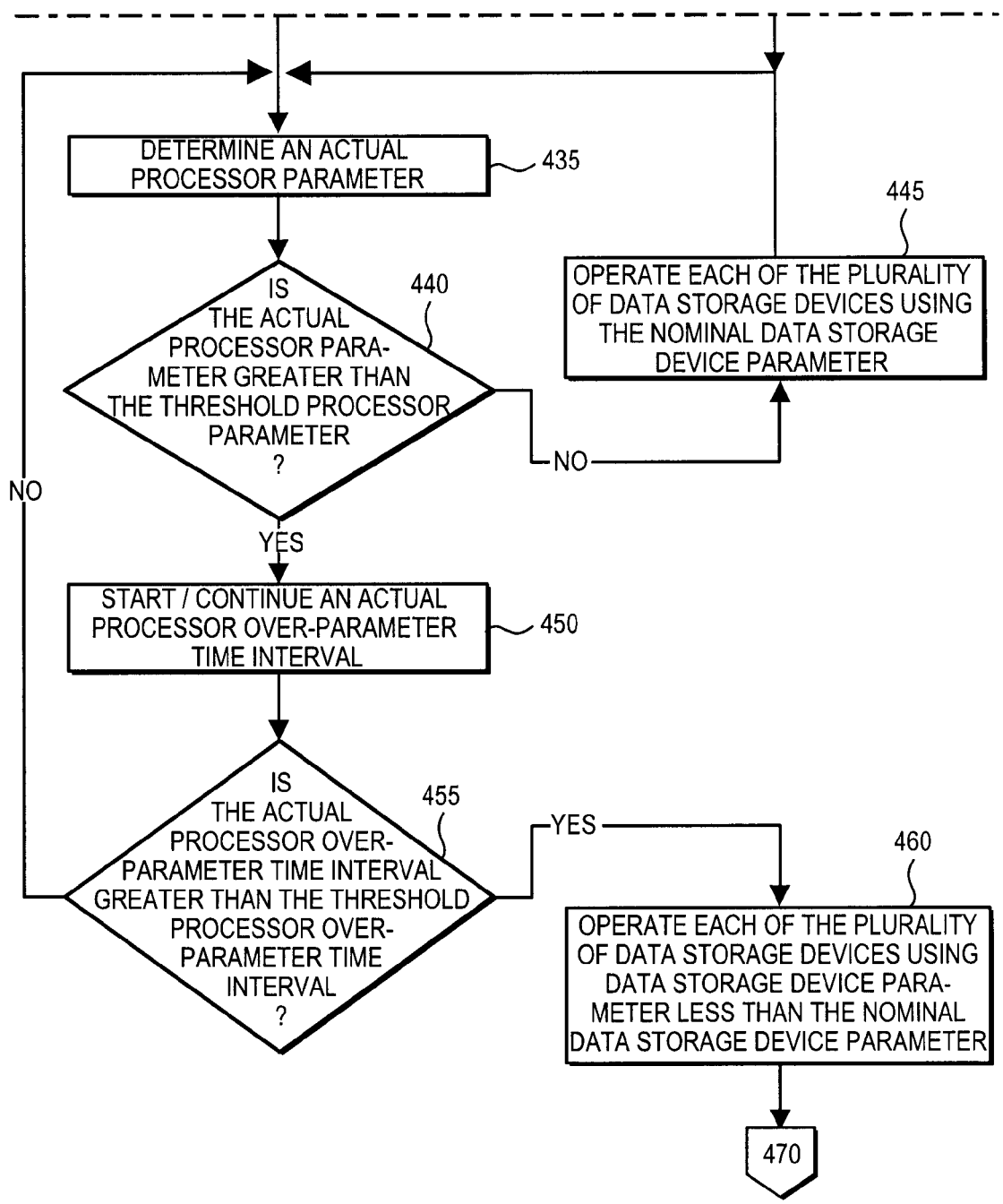
FIG. 4B is a flow chart summarizing additional steps of Applicants' method.

FIGS. 4A and 4B summarizes the initial steps in one embodiment of Applicants' method to manage power consumption in a computing device. Applicants' method described herein is directed to monitoring the operation of one processor. In certain embodiments, Applicants' method independently monitors the operation of a plurality of processors by separately implementing the steps of Applicants' method for each of the monitored processors.

Applicants have found that periods of high processor assembly utilization tend to correspond to periods of low data storage device access. This being the case, Applicants' method monitors a processor parameter value. When that processor parameter value is less than or equal to a threshold value, Applicants' method operates each of a plurality of data storage devices using a nominal data storage device parameter value. When that processor parameter value exceeds the threshold value, Applicants' method operates each of a plurality of data storage devices using a sub-nominal value for the data storage device parameter.

Referring now to FIG. 4A, in step 405 the method selects a processor parameter. The amount of power utilized by a processor is proportional to the value of the processor parameter of step 405. Therefore, an actual value of the processor parameter value selected in step 405 correlates with an actual amount of power consumed by the processor.

In certain embodiments, the processor parameter value of step 405 comprises an instructions per clock cycle ("IPC") metric. Such an IPC metric comprises the average number of clock cycles a processor requires to execute each instruction. As an actual processor IPC increases, the power consumed by the processor also increases.

In certain embodiments, the processor parameter value of step 405 comprises a cycles per instruction ("CPI") metric. As actual CPI decreases, the power consumed by the processor increases.

In certain embodiments, the processor parameter value of step 405 comprises a processor temperature. As an actual processor temperature increases, the power consumed by the processor also increases.

In other embodiments, the processor parameter value of step 405 comprises any of a cache miss rate metric, such as Level-1 cache miss rate or Level-2 cache miss rate, or a branch predictability metric, or an instruction-level parallelism ("ILP") metric, or a speculative mechanism metric, such as numbers of speculative data prefetches or numbers of speculative requests in the memory controller, or any other processor or processor system metric which tends to increase power dissipation. For example, as cache misses decrease, or branch predictability increases, or ILP increases, or the numbers of prefetches or other speculative requests increase, the power consumed by the processor tends to increase.

In certain embodiments, step 405 is performed by the manufacturer of the computing device of step 405. In certain embodiments, step 405 is performed by the owner of the computing device of step 405. In certain embodiments, step 405 is performed by the operator of the computing device of step 405. In certain embodiments, step 405 is performed by a host computer in communication with the computing device of step 405.

In step 410, the method determines whether to establish and use a plurality of threshold processor parameter values. In certain embodiments, step 410 is performed by the manufacturer of the computing device of step 405. In certain embodiments, step 410 is performed by the owner of the computing device of step 405. In certain embodiments, step 410 is performed by the operator of the computing device of step 405. In certain embodiments, step 410 is performed by a host computer in communication with the computing device of step 405.

Figure 5A:
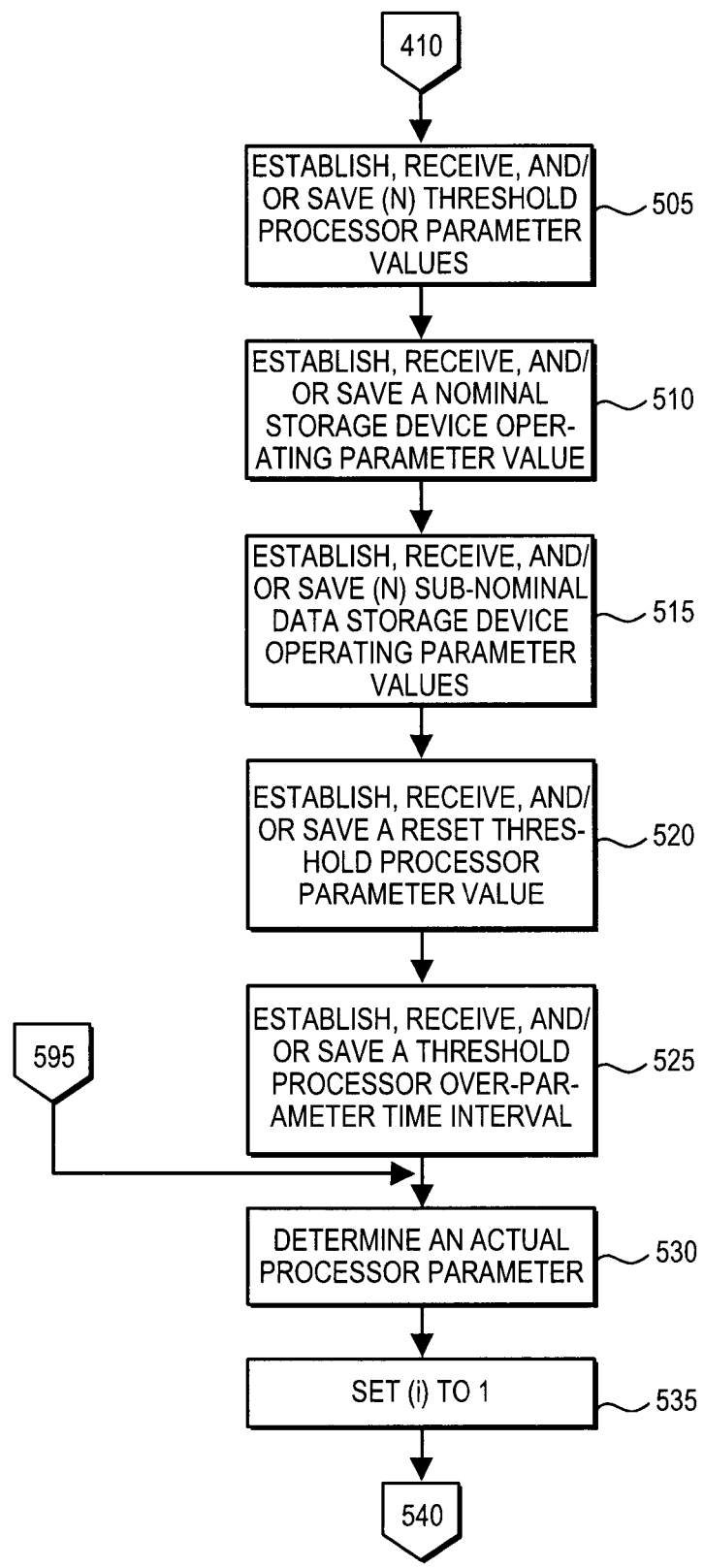
FIG. 5A is a flow chart summarizing additional steps of Applicants' method.

If the method elects in step 410 to establish and use a plurality of threshold processor parameter values, then the method transitions from step 410 to step 505 (FIG. 5A). If the method elects in step 410 not to establish and use a plurality of threshold processor parameter values, then the method transitions from step 410 to step 415, wherein the method establishes a threshold processor parameter value level. The threshold processor parameter value level established in step 415 correlates with a nominal level of power usage by the processor. In certain embodiments, step 415 is performed by the manufacturer of the computing device of step 405. In certain embodiments, step 415 is performed by the owner of the computing device of step 405. In certain embodiments, step 415 is performed by the operator of the computing device of step 405. In certain embodiments, step 415 is performed by a host computer in communication with the computing device of step 405.

In step 420, the method establishes a nominal storage device operating parameter. The power consumption of a data storage device is proportional to the value of the storage device operating parameter of step 420. In certain embodiments, the storage device operating parameter of step 420 comprises a revolutions per minute ("RPM") metric. As those skilled in the art will appreciate, as an information storage medium is rotated at an increased RPM, the power consumed by the data storage device comprising the rotated information storage medium also increases.

In other embodiments, the operating parameter 420 comprises one or more other metrics that reduce power in the storage device, such as the storage controller operating frequency, numbers of redundant storage controllers, numbers of redundant write caches, and other power reduction techniques that are familiar to those skilled in the art. As the storage controller operating frequency is reduced, or the number of redundant controllers is reduced, or the numbers of redundant writes are reduced, the power consumption in the storage device will be reduced. In certain embodiments, the method establishes a nominal value for each metric in step 420.

In certain embodiments, step 420 is performed by the manufacturer of the computing device of step 405. In certain embodiments, step 420 is performed by the owner of the computing device of step 405. In certain embodiments, step 420 is performed by the operator of the computing device of step 405. In certain embodiments, step 420 is performed by a host computer in communication with the computing device of step 405.

In step 425, the method establishes a threshold processor parameter reset value. In certain embodiments, step 425 is performed by the manufacturer of the computing device of step 405. In certain embodiments, step 425 is performed by the owner of the computing device of step 405. In certain embodiments, step 425 is performed by the operator of the computing device of step 405. In certain embodiments, step 425 is performed by a host computer in communication with the computing device of step 405.

In step 430, the method establishes a threshold processor over-parameter time interval. By "processor over-parameter time interval," Applicants mean a period of time wherein an actual value of a selected processor parameter value is continuously greater than the threshold processor parameter value of step 415. In certain embodiments, step 430 is performed by the manufacturer of the computing device of step 405. In certain embodiments, step 430 is performed by the owner of the computing device of step 405. In certain embodiments, step 430 is performed by the operator of the computing device of step 405. In certain embodiments, step 430 is performed by a host computer in communication with the computing device of step 405.

In step 435, the method determines an actual processor parameter value. If the method selected a processor CPI as a metric in step 405, then in step 435 the method determines an actual processor CPI. If the method selected a processor temperature as a metric in step 405, then in step 435 the method determines an actual processor temperature. If the method selected any other processor parameter such as CPI, cache misses, branch predictability, ILP, speculation mechanism, or other metric associated with increased processor power as a metric in step 405, then in step 435 the method determines an actual processor value for that metric.

In certain embodiments, step 435 is performed by the monitored processor. In certain embodiments, step 435 is performed by a sensor disposed in a processor assembly comprising the monitored processor. In certain embodiments, step 435 is performed by a host computer in communication with the monitored processor wherein the host computer utilizes signals provided by a sensor disposed in a processor assembly comprising the monitored processor. In certain embodiments, step 435 is performed by a processor disposed in a storage assembly, wherein that storage assembly is in communication with the processor assembly comprising the monitored processor.

In step 440, the method determines if the actual processor parameter value of step 435 is greater than the threshold processor parameter value of step 415. In certain embodiments, step 440 is performed by the monitored processor. In certain embodiments, step 440 is performed by a sensor disposed in a processor assembly comprising the monitored processor. In certain embodiments, step 440 is performed by a host computer in communication with the monitored processor wherein the host computer utilizes signals provided by a sensor disposed in a processor assembly comprising the monitored processor. In certain embodiments, step 440 is performed by a processor disposed in a storage assembly, wherein that storage assembly is in communication with the processor assembly comprising the monitored processor.

If the method determines in step 440 that the actual processor parameter value of step 435 is not greater than the threshold processor parameter value of step 415, then the method transitions from step 440 to step 445 wherein the method operates each of a plurality of data storage devices at the nominal data storage device operating parameter value of step 420. In certain embodiments, step 445 comprises providing a first alert signal from the processor assembly comprising the monitored processor to a storage assembly in communication with the processor assembly, wherein upon receipt of that first alert signal a processor disposed in the storage assembly causes each data storage device disposed in the storage assembly to operate at the nominal data storage device operating parameter value of step 420.

If the method determines in step 440 that the actual processor parameter value of step 435 is greater than the threshold processor parameter value of step 415, then the method transitions from step 440 to step 450 wherein the method starts, or continues, an actual processor over-parameter time interval. In certain embodiments, step 450 is performed by the monitored processor. In certain embodiments, step 450 is performed by a sensor disposed in a processor assembly comprising the monitored processor. In certain embodiments, step 450 is performed by a host computer in communication with the monitored processor wherein the host computer utilizes signals provided by a sensor disposed in a processor assembly comprising the monitored processor. In certain embodiments, step 450 is performed by a processor disposed in a storage assembly, wherein that storage assembly is in communication with the processor assembly comprising the monitored processor.

In step 455, the method determines if the actual processor over-parameter time interval is greater than the threshold processor over-parameter time interval of step 435. In certain embodiments, the method further determines in step 455 if the actual processor parameter value is, and was throughout the entire actual processor over-parameter time interval, greater than the threshold processor parameter value of step 415.

In certain embodiments, step 455 is performed by the monitored processor. In certain embodiments, step 455 is performed by a sensor disposed in a processor assembly comprising the monitored processor. In certain embodiments, step 455 is performed by a host computer in communication with the monitored processor wherein the host computer utilizes signals provided by a sensor disposed in a processor assembly comprising the monitored processor. In certain embodiments, step 455 is performed by a processor disposed in a storage assembly, wherein that storage assembly is in communication with the processor assembly comprising the monitored processor.

If the method determines in step 455 that the actual processor over-parameter time interval is not greater than the threshold processor over-parameter time interval of step 435, then the method transitions from step 455 to step 435 and continues as described herein. Alternatively, if the method determines in step 455 that the actual processor over-parameter time interval is greater than the threshold processor, then the method transitions from step 455 to step 460 wherein the method operates each of a plurality of data storage devices using a data storage device operating parameter value that is less than the nominal data storage device operating parameter value of step 420. In certain embodiments, step 460 comprises providing a second alert signal from the processor assembly comprising the monitored processor to a storage assembly in communication with the processor assembly, wherein upon receipt of that second alert signal a processor disposed in the storage assembly causes each data storage device disposed in the storage assembly to operate each of a plurality of data storage devices using a data storage device operating parameter that is less than the nominal data storage device operating parameter value of step 420.

The method transitions from step 460 to step 470 (FIG. 4C) wherein the method determines an actual processor parameter value. In certain embodiments, step 470 is performed by the monitored processor. In certain embodiments, step 470 is performed by a sensor disposed in a processor assembly comprising the monitored processor. In certain embodiments, step 470 is performed by a host computer in communication with the monitored processor wherein the host computer utilizes signals provided by a sensor disposed in a processor assembly comprising the monitored processor. In certain embodiments, step 470 is performed by a processor disposed in a storage assembly, wherein that storage assembly is in communication with the processor assembly comprising the monitored processor.

In step 480, the method determines if the actual processor parameter value of step 470 is greater than the threshold processor parameter reset value of step 425. In certain embodiments, step 480 is performed by the monitored processor. In certain embodiments, step 480 is performed by a sensor disposed in a processor assembly comprising the monitored processor. In certain embodiments, step 480 is performed by a host computer in communication with the monitored processor wherein the host computer utilizes signals provided by a sensor disposed in a processor assembly comprising the monitored processor. In certain embodiments, step 480 is performed by a processor disposed in a storage assembly, wherein that storage assembly is in communication with the processor assembly comprising the monitored processor.

If the method determines in step 480 that the actual processor parameter value of step 435 is greater than the threshold processor parameter value reset value of step 425, then the method transitions from step 480 to step 470 and continues as described herein. Alternatively, if the method determines in step 480 that the actual processor parameter value of step 435 is not greater than the threshold processor parameter value reset value of step 425, then the method transitions from step 480 to step 490 wherein the method operates each of a plurality of data storage devices at the nominal data storage device operating parameter value of step 420. In certain embodiments, step 490 comprises providing a reset signal from the processor assembly comprising the monitored processor to a storage assembly in communication with the processor assembly, wherein upon receipt of that reset signal a processor disposed in the storage assembly causes each data storage device disposed in the storage assembly to operate at the nominal data storage device operating parameter value of step 420. The method transitions from step 490 to step 435 and continues as described herein.

If the method elects in step 410 to establish and use a plurality of threshold processor parameter value levels, then the method transitions from step 410 to step 505 (FIG. 5A), wherein the method establishes (N) threshold processor parameter values, wherein the (i)th threshold processor parameter value is greater than the (i−1)th threshold processor parameter value, wherein (i) is greater than or equal to 2 and less than or equal to (N). In certain embodiments, step 505 is performed by the manufacturer of the computing device of step 405. In certain embodiments, step 505 is performed by the owner of the computing device of step 405. In certain embodiments, step 505 is performed by the operator of the computing device of step 405. In certain embodiments, step 505 is performed by a host computer in communication with the computing device of step 405.

In step 510, the method establishes a nominal storage device operating parameter value. The power consumption of a data storage device is proportional to the value of the storage device operating parameter of step 510. In certain embodiments, the storage device operating parameter of step 510 comprises disk revolutions per minute ("RPM"). As those skilled in the art will appreciate, as a disk RPM increases the power consumption of the data storage device comprising the disk increases. In certain embodiments, the method establishes a nominal disk RPM in step 510.

In other embodiments, the operating parameter 510 comprises one or more other metrics that reduce power in the storage device, such as the storage controller operating frequency, numbers of redundant storage controllers, numbers of redundant writes cached, and other power reduction techniques that are familiar to those skilled in the art. As the storage controller operating frequency is reduced, or the number of redundant controllers is reduced, or the numbers of redundant writes are reduced, the power consumption in the storage device will be reduced. In certain embodiments, the method establishes a nominal value for the metric in step 510.

In certain embodiments, step 510 is performed by the manufacturer of the computing device of step 405. In certain embodiments, step 510 is performed by the owner of the computing device of step 405. In certain embodiments, step 510 is performed by the operator of the computing device of step 405. In certain embodiments, step 510 is performed by a host computer in communication with the computing device of step 405.

In step 515, the method establishes (N) sub-nominal data storage device parameter values, wherein the (i)th sub-nominal data storage device parameter value is less than the (i−1)th sub-nominal data storage device parameter value, wherein (i) is greater than or equal to 2 and less than or equal than (N). In certain embodiments, step 515 is performed by the manufacturer of the computing device of step 405. In certain embodiments, step 515 is performed by the owner of the computing device of step 405. In certain embodiments, step 515 is performed by the operator of the computing device of step 405. In certain embodiments, step 515 is performed by a host computer in communication with the computing device of step 405.

In step 520, the method establishes a threshold processor parameter reset value. In certain embodiments, step 520 is performed by the manufacturer of the computing device of step 405. In certain embodiments, step 520 is performed by the owner of the computing device of step 405. In certain embodiments, step 520 is performed by the operator of the computing device of step 405. In certain embodiments, step 520 is performed by a host computer in communication with the computing device of step 405.

In step 525, the method establishes, for each value of (i), an (i)th threshold processor over-parameter time interval, wherein (i) is greater than or equal to 1 and less than or equal to (N). By an "(i)th processor over-parameter time interval," Applicants mean a period of time wherein an actual value of a selected processor parameter value is continuously greater than an (i)th threshold processor parameter value of step 505. In certain embodiments, step 525 is performed by the manufacturer of the computing device of step 405. In certain embodiments, step 525 is performed by the owner of the computing device of step 405. In certain embodiments, step 525 is performed by the operator of the computing device of step 405. In certain embodiments, step 525 is performed by a host computer in communication with the computing device of step 405.

In step 530, the method determines an actual processor parameter value. If the method selected a processor IPC as a metric in step 405, then in step 530 the method determines an actual processor IPC. If the method selected a processor temperature as a metric in step 405, then in step 530 the method determines an actual processor temperature. If the method selected any other processor parameter such as CPI, cache misses, branch predictability, ILP, speculation mechanism, or other metric associated with increased processor power as a metric in step 405, then in step 530 the method determines an actual processor value for that metric.

In certain embodiments, step 530 is performed by the monitored processor. In certain embodiments, step 530 is performed by a sensor disposed in a processor assembly comprising the monitored processor. In certain embodiments, step 530 is performed by a host computer in communication with the monitored processor wherein the host computer utilizes signals provided by a sensor disposed in a processor assembly comprising the monitored processor. In certain embodiments, step 530 is performed by a processor disposed in a storage assembly, wherein that storage assembly is in communication with the processor assembly comprising the monitored processor.

In step 535, the method sets (i) to 1. In certain embodiments, step 535 is performed by the monitored processor. In certain embodiments, step 535 is performed by a sensor disposed in a processor assembly comprising the monitored processor. In certain embodiments, step 535 is performed by a host computer in communication with the monitored processor wherein the host computer utilizes signals provided by a sensor disposed in a processor assembly comprising the monitored processor. In certain embodiments, step 535 is performed by a processor disposed in a storage assembly, wherein that storage assembly is in communication with the processor assembly comprising the monitored processor.

Figure 5B:
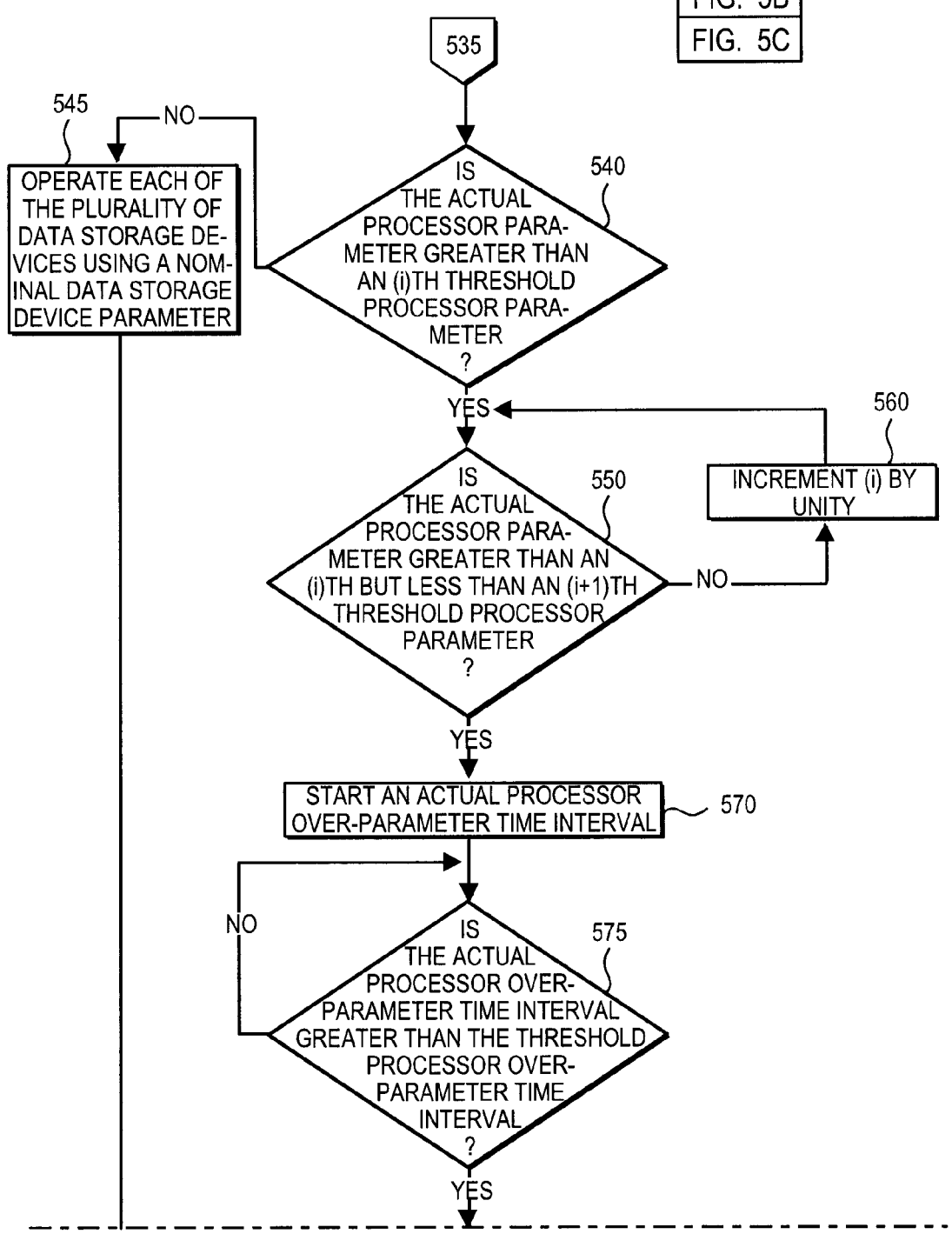
FIG. 5B is a flow chart summarizing additional steps of Applicants' method.

Referring now to FIG. 5B, in step 540 the method determines if the actual processor parameter value of step 435 is greater than a first threshold processor parameter value of step 505 (FIG. 5A). In certain embodiments, step 540 is performed by the monitored processor. In certain embodiments, step 540 is performed by a sensor disposed in a processor assembly comprising the monitored processor. In certain embodiments, step 540 is performed by a host computer in communication with the monitored processor wherein the host computer utilizes signals provided by a sensor disposed in a processor assembly comprising the monitored processor. In certain embodiments, step 540 is performed by a processor disposed in a storage assembly, wherein that storage assembly is in communication with the processor assembly comprising the monitored processor.

If the method determines in step 540 that the actual processor parameter value of step 435 is not greater than a first threshold processor parameter value of step 505, then the method transitions from step 540 to step 545 wherein the method operates each of a plurality of data storage devices at the nominal data storage device operating parameter value of step 510 (FIG. 5A). In certain embodiments, step 545 comprises providing a first alert signal from the processor assembly comprising the monitored processor to a storage assembly in communication with the processor assembly, wherein upon receipt of that first alert signal a processor disposed in the storage assembly causes each data storage device disposed in the storage assembly to operate at the nominal data storage device operating parameter value of step 510.

If the method determines in step 540 that the actual processor parameter value of step 530 (FIG. 5A) is greater than the first threshold processor parameter value of step 505, then the method transitions from step 540 to step 550 wherein the method determines if the actual processor parameter value of step 530 is greater than the (i)th threshold processor parameter value but less than the (i+1)th threshold processor parameter value. If (i) equals (N) in step 550, then the (i+1)th threshold processor parameter value equals 0 because the method has not established a (N+1)th threshold processor parameter value.

In certain embodiments, step 550 is performed by the monitored processor. In certain embodiments, step 550 is performed by a sensor disposed in a processor assembly comprising the monitored processor. In certain embodiments, step 550 is performed by a host computer in communication with the monitored processor wherein the host computer utilizes signals provided by a sensor disposed in a processor assembly comprising the monitored processor. In certain embodiments, step 550 is performed by a processor disposed in a storage assembly, wherein that storage assembly is in communication with the processor assembly comprising the monitored processor.

If the method determines in step 550 that the actual processor parameter value of step 530 is greater than the (i)th threshold processor parameter value but not less than the (i+1)th threshold processor parameter value, then the method transitions from step 550 to 560 wherein the method increments (i) by unity. The method transitions from step 560 to step 550 and continues as described herein. In certain embodiments, step 560 is performed by the monitored processor. In certain embodiments, step 560 is performed by a sensor disposed in a processor assembly comprising the monitored processor. In certain embodiments, step 560 is performed by a host computer in communication with the monitored processor wherein the host computer utilizes signals provided by a sensor disposed in a processor assembly comprising the monitored processor. In certain embodiments, step 560 is performed by a processor disposed in a storage assembly, wherein that storage assembly is in communication with the processor assembly comprising the monitored processor.

If the method determines in step 550 that the actual processor parameter value of step 530 is greater than the (i)th threshold processor parameter value but less than the (i+1)th threshold processor parameter value, then the method transitions from step 550 to step 570 wherein the method starts, or continues, an actual processor over-parameter time interval. In certain embodiments, step 570 is performed by the monitored processor. In certain embodiments, step 570 is performed by a sensor disposed in a processor assembly comprising the monitored processor. In certain embodiments, step 570 is performed by a host computer in communication with the monitored processor wherein the host computer utilizes signals provided by a sensor disposed in a processor assembly comprising the monitored processor. In certain embodiments, step 570 is performed by a processor disposed in a storage assembly, wherein that storage assembly is in communication with the processor assembly comprising the monitored processor.

In step 575, the method determines if the actual processor over-parameter time interval is greater than an (i)th threshold processor over-parameter time interval of step 525 (FIG. 5A). In certain embodiments, the method further determines in step 575 if the actual processor parameter value is, and was throughout the entire actual processor over-parameter time interval, greater than the (i)th threshold processor parameter value of step 505 (FIG. 5A).

In certain embodiments, step 575 is performed by the monitored processor. In certain embodiments, step 575 is performed by a sensor disposed in a processor assembly comprising the monitored processor. In certain embodiments, step 575 is performed by a host computer in communication with the monitored processor wherein the host computer utilizes signals provided by a sensor disposed in a processor assembly comprising the monitored processor. In certain embodiments, step 575 is performed by a processor disposed in a storage assembly, wherein that storage assembly is in communication with the processor assembly comprising the monitored processor.

If the method determines in step 575 that the actual processor over-parameter time interval is not greater than the threshold processor over-parameter time interval of step 525 (FIG. 5A), then the method continues to compare the actual processor over-parameter time interval with the (i)th threshold processor over-parameter time interval. Alternatively, if the method determines in step 575 that the actual processor over-parameter time interval is greater than the (i)th threshold processor over-parameter time interval, then the method transitions from step 575 to step 580 wherein the method operates each of a plurality of data storage devices using an (i)th sub-nominal data storage device operating parameter of step 515 (FIG. 5A). In certain embodiments, step 580 comprises providing an (i)th alert signal from the processor assembly comprising the monitored processor to a storage assembly in communication with the processor assembly, wherein upon receipt of that (i)th alert signal a processor disposed in the storage assembly causes each data storage device disposed in the storage assembly to operate each of a plurality of data storage devices using an (i)th sub-nominal data storage device operating parameter.

The method transitions from step 580 to step 585 (FIG. 5C) wherein the method determines an actual processor parameter value. In certain embodiments, step 585 is performed by the monitored processor. In certain embodiments, step 585 is performed by a sensor disposed in a processor assembly comprising the monitored processor. In certain embodiments, step 585 is performed by a host computer in communication with the monitored processor wherein the host computer utilizes signals provided by a sensor disposed in a processor assembly comprising the monitored processor. In certain embodiments, step 585 is performed by a processor disposed in a storage assembly, wherein that storage assembly is in communication with the processor assembly comprising the monitored processor.

In step 590, the method determines if the actual processor parameter value of step 585 is greater than the threshold processor parameter reset value of step 520 (FIG. 5A). In certain embodiments, step 590 is performed by the monitored processor. In certain embodiments, step 590 is performed by a sensor disposed in a processor assembly comprising the monitored processor. In certain embodiments, step 590 is performed by a host computer in communication with the monitored processor wherein the host computer utilizes signals provided by a sensor disposed in a processor assembly comprising the monitored processor. In certain embodiments, step 590 is performed by a processor disposed in a storage assembly, wherein that storage assembly is in communication with the processor assembly comprising the monitored processor.

If the method determines in step 590 that the actual processor parameter value of step 585 is greater than the threshold processor parameter reset value of step 520, then the method transitions from step 590 to step 585 and continues as described herein. Alternatively, if the method determines in step 590 that the actual processor parameter value of step 585 is not greater than the threshold processor parameter reset value of step 520 (FIG. 5A), then the method transitions from step 590 to step 595 wherein the method operates each of a plurality of data storage devices at the nominal data storage device operating parameter value of step 420. In certain embodiments, step 595 comprises providing a reset signal from the processor assembly comprising the monitored processor to a storage assembly in communication with the processor assembly, wherein upon receipt of that reset signal a processor disposed in the storage assembly causes each data storage device disposed in the storage assembly to operate at the nominal data storage device operating parameter value of step 510 (FIG. 5A). The method transitions from step 595 to step 530 (FIG. 5A) and continues as described herein.

In certain embodiments, individual steps recited in FIGS. 4A, 4B, 5A, and/or 5B, may be combined, eliminated, or reordered.

Figure 4C:
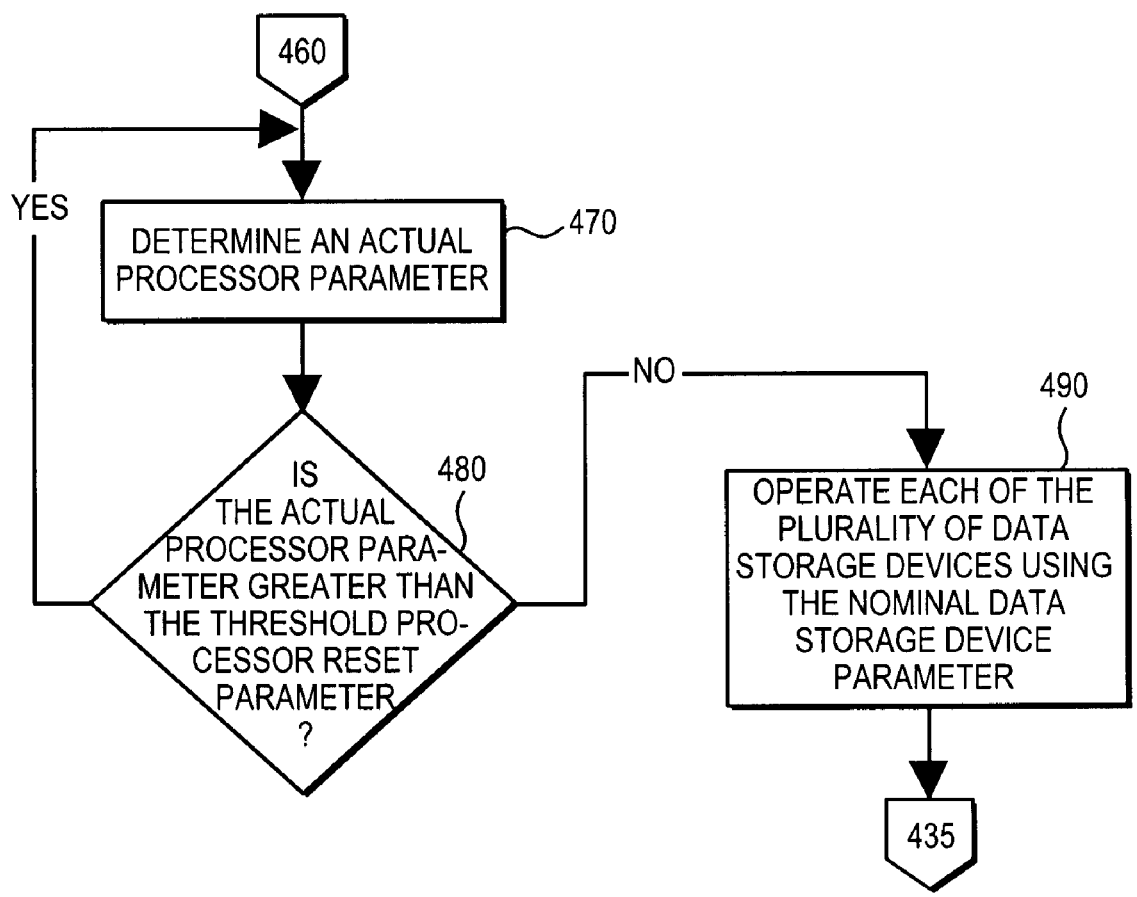
FIG. 4C is a flow chart summarizing additional steps of Applicants' method.
Figure 5C:
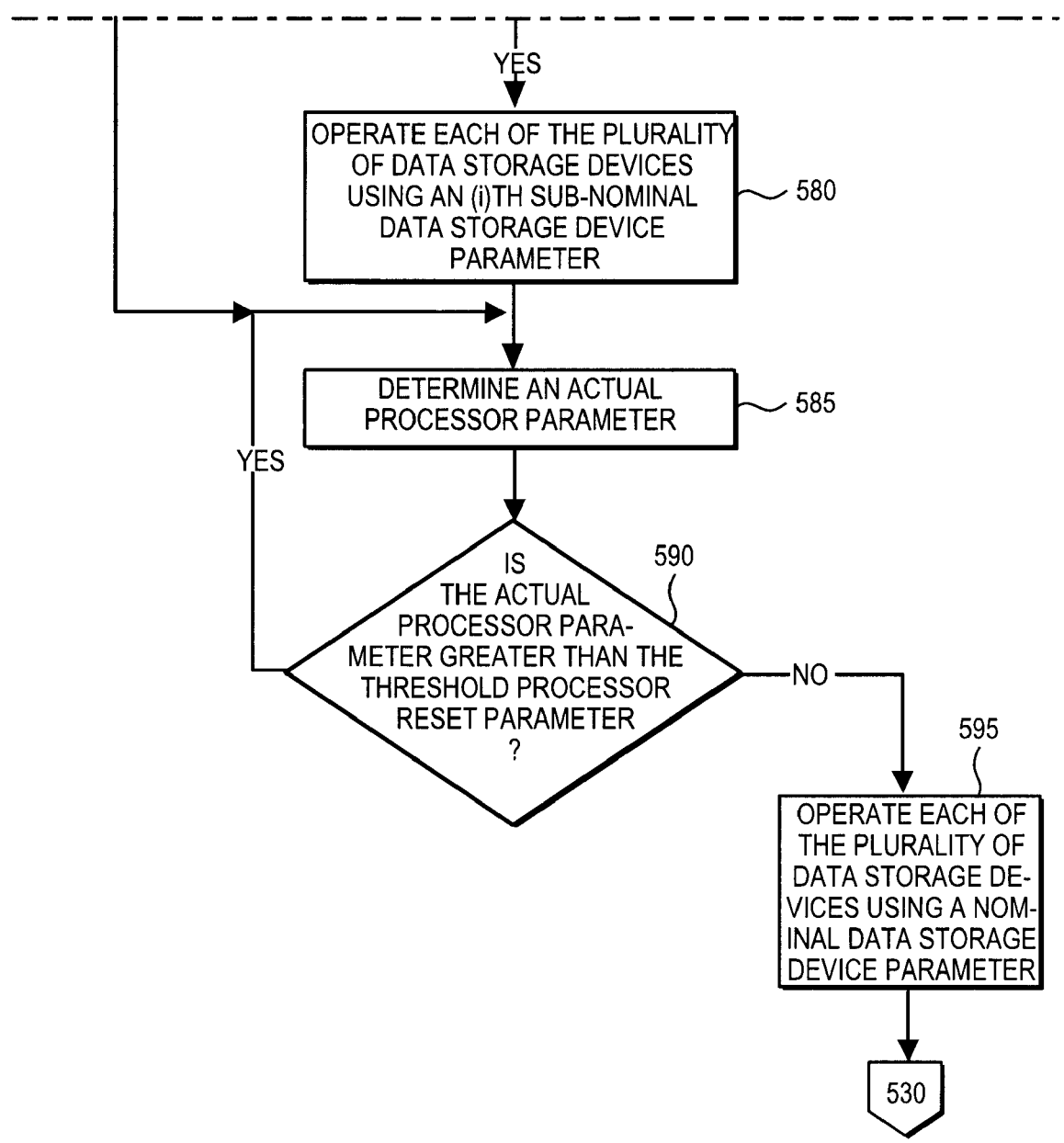
FIG. 5C is a flow chart summarizing additional steps of Applicants' method.

In certain embodiments, Applicants' invention includes instructions, such as instructions 228 (FIG. 2), and/or instructions 248 (FIG. 2), and/or instructions 278 (FIG. 2), residing in computer readable medium, such as for example memory 220 (FIG. 2), and/or memory 240 (FIG. 2), and/or memory 270 (FIG. 2), respectively, wherein those instructions are executed by a processor, such as processor 213 (FIG. 2), and/or processor 233 (FIG. 2), and/or processor 255 (FIG. 2), respectively, to perform one or more of steps 410, 415, 420, 425, 430, 440, 445, 450, 455, and/or 460, recited in FIGS. 4A and 4B, and/or one or more of steps 470, 480, and/or 490, recited in FIG. 4C, and/or one or more of steps 505, 510, 515, 520, 525, 530, and/or 535, recited in FIG. 5A, and/or one or more of steps 540, 545, 550, 560, 570, 575, 580, 585, 590, and/or 595, recited in FIGS. 5B and 5C.

In other embodiments, Applicants' invention includes instructions residing in any other computer program product, where those instructions are executed by a computer external to, or internal to, Applicants' data storage library to perform one or more of steps 410, 415, 420, 425, 430, 440, 445, 450, 455, and/or 460, recited in FIGS. 4A and 4B, and/or one or more of steps 470, 480, and/or 490, recited in FIG. 4c, and/or one or more of steps 505, 510, 515, 520, 525, 530, and/or 535, recited in FIG. 5A, and/or one or more of steps 540, 545, 550, 560, 570, 575, 580, 585, 590, and/or 595, recited in FIGS. 5B and 5C. In either case, the instructions may be encoded in a computer readable medium such as, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to manage power in a computing device comprising a controller assembly and a storage assembly comprising a plurality of data storage devices, comprising the steps of:
    selecting a processor parameter, wherein an amount of power consumed by a processor is proportional to a value of said processor parameter;
    establishing a threshold processor parameter value;
    selecting a data storage device parameter, wherein an amount of power consumed by a data storage device is proportional to a value of said data storage device parameter;
    establishing a nominal data storage device parameter value;
    determining an actual processor parameter value;
    when said actual processor parameter value is less than or equal to said threshold processor parameter value, operating each of said plurality of data storage devices using said nominal data storage device parameter value;
    when said actual processor parameter value is greater than said threshold processor parameter value, operating each of said plurality of data storage devices using a data storage device parameter value less than said nominal data storage device parameter value.

2. The method of claim 1, further comprising the steps of:
    establishing a reset processor parameter value, wherein said reset processor parameter value is less than said threshold processor parameter value;
    when said actual processor parameter value is less than said reset processor parameter value, operating each of said plurality of data storage devices using said nominal data storage device parameter value.

3. The method of claim 1, wherein:
    said establishing a threshold processor parameter value comprises establishing a threshold processor temperature;
    said determining an actual processor parameter value comprises determining an actual processor temperature; and
    said actual processor parameter value is greater than said threshold processor parameter value if said actual processor temperature is greater than said threshold processor temperature.

4. The method of claim 3, further comprising the steps of:
    establishing a threshold processor over-temperature time interval;

determining an actual processor over-temperature time interval comprising the time interval wherein said actual processor temperature is greater than said threshold processor temperature;

wherein said actual processor parameter value is greater than said threshold processor parameter value if said actual processor temperature is greater than said threshold processor temperature and if said actual processor over-temperature interval is greater than said threshold processor over-temperature interval.

5. The method of claim 1, wherein:

said establishing a threshold processor parameter value comprises establishing a threshold processor performance;

said determining an actual processor parameter value comprises determining an actual processor performance; and said actual processor parameter value is greater than said threshold processor parameter value if said actual processor performance is greater than said threshold processor performance.

6. The method of claim 5, wherein:

said establishing a threshold processor parameter value further comprises establishing a threshold processor over-performance time interval;

said determining an actual processor parameter value further comprises determining an actual processor over-performance time interval comprising the time interval wherein said actual processor performance exceeded said threshold processor performance;

said actual processor parameter value is greater than said threshold processor parameter value if said actual processor performance is greater than said threshold processor performance and if said actual processor over-performance interval is greater than said threshold processor over-performance interval.

7. A method to manage power in a computing device comprising a controller assembly and a storage assembly comprising a plurality of data storage devices, comprising the steps of:

selecting a processor parameter, wherein an amount of power consumed by a processor is proportional to a value of said processor parameter;

establishing (N) threshold processor parameter values, wherein (N) is greater than 1;

selecting a data storage device parameter, wherein an amount of power consumed by a data storage device is proportional to a value of said data storage device parameter;

establishing a nominal storage device parameter value;

establishing (N) sub-nominal data storage device parameter values;

determining an actual processor parameter value;

when said actual processor parameter value is less than a first threshold processor parameter value, operating each of said plurality of data storage devices using said nominal data storage device parameter value;

when, for each incremental value of (i), said actual processor parameter value is greater than an (i)th threshold processor parameter value but less than an (i+1)th threshold processor parameter value, operating each of said plurality of data storage devices using an (i)th sub-nominal data storage device parameter value, wherein (i) is greater than or equal to 1 and less than or equal to (N), and wherein (i) is initially set to 1 and is incremented sequentially by unity.

8. The method of claim 7, further comprising the steps of:
establishing a threshold processor parameter reset value;

when said actual processor parameter value is less than said processor parameter reset value, operating each of said plurality of data using said nominal data storage device parameter value.

9. The method of claim 7, wherein:

said establishing an (i)th threshold processor parameter value comprises establishing an (i)th threshold processor temperature;

said determining an actual processor parameter value comprises determining an actual processor temperature; and said actual processor parameter value is greater than an (i)th threshold processor parameter value if said actual processor temperature is greater than an (i)th threshold processor temperature.

10. The method of claim 9, further comprising the steps of:

establishing, for each value of (i), an (i)th threshold processor over-temperature time interval;

determining an (i)th actual processor over-temperature time interval comprising the time interval wherein said actual processor temperature is greater than said (i)th threshold processor temperature;

wherein said actual processor parameter value is greater than an (i)th threshold processor parameter value if said actual processor temperature is greater than an (i)th threshold processor temperature and if said actual processor over-temperature interval is greater than an (i)th threshold processor over-temperature interval.

11. The method of claim 7, wherein:

said establishing an (i)th threshold processor parameter value comprises establishing an (i)th threshold processor performance;

said determining an actual processor parameter value comprises determining an actual processor performance; and said actual processor parameter value is greater than an (i)th threshold processor parameter value if said actual processor performance is greater than said (i)th threshold processor performance.

12. The method of claim 11, further comprising the steps of:

establishing a threshold processor over-performance time interval;

determining an (i)th actual processor over-performance time interval comprising the time interval wherein said actual processor performance exceeds an (i)th threshold processor performance;

wherein said actual processor parameter value is greater than an (i)th threshold processor parameter value if said actual processor performance is greater than an (i)th threshold processor performance and if said actual processor over-performance interval is greater than an (i)th threshold processor over-performance interval.

13. An article of manufacture comprising a controller assembly, a storage assembly comprising a plurality of data storage devices, and a computer readable medium having computer readable program code disposed therein to manage power in a computing device, the computer readable program code comprising a series of computer readable program steps to effect:

selecting a processor parameter, wherein an amount of power consumed by a processor is proportional to a value of said processor parameter;

retrieving a threshold processor parameter value;

selecting a data storage device parameter, wherein an amount of power consumed by a data storage device is proportional to a value of said data storage device parameter;

retrieving a nominal data storage device parameter value;

determining an actual processor parameter value;
when said actual processor parameter value is less than or equal to said threshold processor parameter value, operating each of said plurality of data storage devices using said nominal data storage device parameter value;
when said actual processor parameter value is greater than said threshold processor parameter value, operating each of said plurality of data storage devices using a data storage device parameter value less than said nominal data storage device parameter value.

14. The article of manufacture of claim 13, said computer readable program code further comprising a series of computer readable program steps to effect:
retrieving a reset processor parameter value, wherein said reset processor parameter value is less than said threshold processor parameter value;
when said actual processor parameter value is less than said reset processor parameter value, operating each of said plurality of data storage devices using said nominal data storage device parameter value.

15. The article of manufacture of claim 13, wherein:
said computer readable program code to retrieve a threshold processor parameter value comprises computer readable program code comprising a series of computer readable program steps to effect retrieving a threshold processor temperature;
said computer readable program code to determine an actual processor parameter value comprises computer readable program code comprising a series of computer readable program steps to effect determining an actual processor temperature; and
said actual processor parameter value is greater than said threshold processor parameter value if said actual processor temperature is greater than said threshold processor temperature.

16. The article of manufacture of claim 15, said computer readable program code further comprising a series of computer readable program steps to effect:
establishing a threshold processor over-temperature time interval;
determining an actual processor over-temperature time interval comprising the time interval wherein said actual processor temperature is greater than said threshold processor temperature;
wherein said actual processor parameter value is greater than said threshold processor parameter value if said actual processor temperature is greater than said threshold processor temperature and if said actual processor over-temperature interval is greater than said threshold processor over-temperature interval.

17. The article of manufacture of claim 13, wherein:
said computer readable program code to retrieve a threshold processor parameter value comprises computer readable program code comprising a series of computer readable program steps to effect retrieving a threshold processor performance;
said computer readable program code to determine an actual processor parameter value comprises computer readable program code comprising a series of computer readable program steps to effect determining an actual processor performance; and
said actual processor parameter value is greater than said threshold processor parameter value if said actual processor performance is greater than said threshold processor performance.

18. The article of manufacture of claim 17, said computer readable program code further comprising a series of computer readable program steps to effect:
establishing a threshold processor over-performance time interval;
determining an actual processor over-performance time interval comprising the time interval wherein said actual processor performance is greater than said threshold processor performance;
wherein said actual processor parameter value is greater than said threshold processor parameter value if said actual processor performance is greater than said threshold processor performance and if said actual processor over-performance time interval is greater than said threshold processor over-performance time interval.

19. An article of manufacture comprising a controller assembly, a storage assembly comprising a plurality of data storage devices, and a computer readable medium having computer readable program code disposed therein to manage power in a computing device, the computer readable program code comprising a series of computer readable program steps to effect:
selecting a processor parameter, wherein an amount of power consumed by processor is proportional to a value of said processor parameter;
retrieving (N) threshold processor parameter values, wherein (N) is greater than 1;
selecting a data storage device parameter, wherein an amount of power consumed by a data storage device is proportional to a value of said data storage device parameter;
retrieving a nominal storage device parameter value;
retrieving (N) sub-nominal data storage device parameter values;
determining an actual processor parameter value;
when said actual processor parameter value is less than a first threshold processor parameter value, operating each of said plurality of data storage devices using said nominal data storage device parameter value;
when, for each incremental value of (i), said actual processor parameter value is greater than an (i)th threshold processor parameter value but less than an (i+1)th threshold processor parameter value, operating each of said plurality of data storage devices using an (i)th sub-nominal data storage device parameter value, wherein (i) is greater than or equal to 1 and less than or equal to (N), and wherein (i) is initially set to 1 and is incremented sequentially by unity.

20. The article of manufacture of claim 19, said computer readable program code further comprising a series of computer readable program steps to effect:
establishing a threshold processor parameter reset value;
when said actual processor parameter value is less than said processor parameter reset value, operating each of said plurality of data using said nominal data storage device parameter value.

21. The article of manufacture of claim 19, wherein:
said computer readable program code to retrieve an (i)th threshold processor parameter value comprises computer readable program code comprising a series of computer readable program steps to effect retrieving an (i)th threshold processor temperature;
said computer readable program code to determine an actual processor parameter value comprises computer readable program code comprising a series of computer readable program steps to effect determining an actual processor temperature; and said actual processor parameter value is greater than an (i)th threshold processor parameter value if said actual processor temperature is greater than an (i)th threshold processor temperature.

22. The article of manufacture of claim 21, said computer readable program code further comprising a series of computer readable program steps to effect:

establishing, for each value of (i), an (i)th threshold processor over-temperature time interval;

determining an (i)th actual processor over-temperature time interval comprising the time interval wherein said actual processor temperature is greater than said (i)th threshold processor temperature;

wherein said actual processor parameter value is greater than an (i)th threshold processor parameter value if said actual processor temperature is greater than an (i)th threshold processor temperature and if said actual processor over-temperature time interval is greater than an (i)th threshold processor over-temperature time interval.

23. The article of manufacture of claim 19, wherein:

said computer readable program code to retrieve an (i)th threshold processor parameter value comprises computer readable program code comprising a series of computer readable program steps to effect retrieving an (i)th threshold processor performance;

said computer readable program code to determine an actual processor parameter value comprises computer readable program code comprising a series of computer readable program steps to effect determining an actual processor performance; and said actual processor parameter value is greater than an (i)th threshold processor parameter value if said actual processor performance is greater than said (i)th threshold processor performance.

24. The article of manufacture of claim 23, said computer readable program code further comprising a series of computer readable program steps to effect:

establishing a threshold processor over-performance time interval;

determining an (i)th actual processor over-performance time interval comprising the time interval wherein said actual processor performance exceeds an (i)th threshold processor performance;

wherein said actual processor parameter value is greater than an (i)th threshold processor parameter value if said actual processor performance is greater than an (i)th threshold processor performance and if said actual processor over-performance time interval is greater than an (i)th threshold processor over-performance time interval.

* * * * *